(12) United States Patent
Nitta

(10) Patent No.: US 9,361,570 B2
(45) Date of Patent: Jun. 7, 2016

(54) RFID TAG AND METHOD OF ATTACHING THE SAME

(71) Applicant: SATO HOLDINGS KABUSHIKI KAISHA, Tokyo (JP)

(72) Inventor: Haruhiko Nitta, Tokyo (JP)

(73) Assignee: SATO HOLDINGS KABUSHIKI KAISHA (JP)

(*) Notice: Subject to any disclaimer, the term of this patent is extended or adjusted under 35 U.S.C. 154(b) by 0 days.

(21) Appl. No.: 14/371,349

(22) PCT Filed: Dec. 5, 2012

(86) PCT No.: PCT/JP2012/081514
§ 371 (c)(1),
(2) Date: Jul. 9, 2014

(87) PCT Pub. No.: WO2013/105366
PCT Pub. Date: Jul. 18, 2013

(65) Prior Publication Data
US 2015/0008261 A1    Jan. 8, 2015

(30) Foreign Application Priority Data
Jan. 13, 2012  (JP) .................. 2012-004576

(51) Int. Cl.
*G06K 19/077*   (2006.01)
*G06K 19/07*    (2006.01)

(52) U.S. Cl.
CPC ........ *G06K 19/07758* (2013.01); *G06K 19/077* (2013.01); *G06K 19/0723* (2013.01); *G06K 19/07722* (2013.01); *G06K 19/07771* (2013.01); *G06K 19/07777* (2013.01); *G06K 19/07762* (2013.01); *Y10T 29/49018* (2015.01)

(58) Field of Classification Search
USPC ............................... 235/487–495
See application file for complete search history.

(56) References Cited

U.S. PATENT DOCUMENTS

2007/0125867 A1* 6/2007 Oberle ............ G06K 19/07749
235/492

FOREIGN PATENT DOCUMENTS

| JP | 5-278297 | 10/1993 |
|----|----------|---------|
| JP | 7-196237 | 8/1995 |
| JP | 2000-030015 | 1/2000 |
| JP | 2005-280226 | 10/2005 |
| JP | 2007-122542 | 5/2007 |
| JP | 2008-009537 | 1/2008 |
| JP | 2010-228839 | 10/2010 |
| WO | WO 2009/004728 A1 | 1/2009 |

OTHER PUBLICATIONS

International Search Report dated Mar. 5, 2013 issued in corresponding International patent application No. PCT/JP2012/081514.

* cited by examiner

*Primary Examiner* — Matthew Mikels
(74) *Attorney, Agent, or Firm* — Ostrolenk Faber LLP

(57) ABSTRACT

An RFID tag for stably holding an RFID inlet 3 raised and spaced apart with respect to an article, on which the tag is placed and a method of attaching such an RFID tag. Allow the RFID tag to be raised from a surface of an article by being flexed to bring the RFID tag into contact with a head portion of a banding band. A through hole 8 defined in a tag base 2 allows insertion of the banding band. The hole 8 includes a first through bore 8A and a second through bore 8B. The tag base 2 includes a base region 2A for raising a holding region and a holding region 2B for an RFID inlet 3 for being reused. The base region 2A raises an RFID inlet 3 with respect to an article, and the holding region inlet 2B having the RFID inlet 3 is allowed to be raised from the base region.

1 Claim, 11 Drawing Sheets

RFID TAG AND METHOD OF ATTACHING THE SAME

CROSS-REFERENCE TO RELATED APPLICATIONS

The present application is a 35 U.S.C. §§371 national phase conversion of PCT/JP2012/081514, filed Dec. 5, 2012, which claims priority of Japanese Patent Application No. 2012-004576, filed Jan. 13, 2012, the contents of which are incorporated by reference herein. The PCT International Application was published in the Japanese language.

TECHNICAL FIELD

The present invention relates to RFID (Radio Frequency Identification) tags and methods of attaching the RFID tags, and in particular to an RFID tag to be attached to a metallic material and a method of attaching the RFID tag.

BACKGROUND ART

Conventionally, an RFID tag provided with an RFID inlet having an IC chip and an RFID antenna and capable of wirelessly writing or reading data has been utilized for data management of required data in various fields by attaching the tag to an article of various types and reading and writing various data relating to the article.

However, in a case in which the article is metallic, there is a problem that attaching the RFID tag to the metallic article which come too close to each other may easily cause troubles in data communication. In order to eliminate this problem, a known RFID tag is configured to have a portion thereof for holding the RFID inlet or support folded at a flexed portion and turned away from the remaining part of the tag, whereby the tag is raised like a flag from a metal surface.

However, such an RFID tag may be unstable as it is made of paper and as the flexed portion is not fixed and thus may be unstable in its raised condition. This makes big differences in data communication performance depending on an attachment condition of the RFID tag, and poses a problem in a long term use and an unfavorable environment. Further, as a double-faced tape or the like is used in order to attach the RFID tag to the metallic material, there is also a problem that the RFID tag may not be used for a product having a surface to which fixation using the double-faced tape is difficult.

CITATION LIST

Patent Literature

PTL 1: Japanese Unexamined Patent Application Publication No. 2007-122542

SUMMARY OF INVENTION

Technical Problem

The present invention has been made in view of the above problems.

An object of the present invention is to provide an RFID tag having no trouble in data communication even when an article to which the RFID tag is to be attached is metallic, and to provide a method of attaching such an RFID tag.

Another object of the present invention is to provide an RFID tag capable of stably holding an RFID inlet or support raised and spaced apart with respect to an article to which the tag is attached, and a method of attaching such an RFID tag.

Yet another object of the present invention is to provide an RFID tag having a superior environment resistance and capable of maintaining the RFID tag in a raised state with superior stability even in a long term use, and a method of attaching such an RFID tag.

Yet another object of the present invention is to provide an RFID tag providing stability for a flexed portion of the RFID tag, and a method of attaching such an RFID tag.

Yet another object of the present invention is to provide an RFID tag that may be produced at a low price, and a method of attaching such an RFID tag.

Solution to Problem

The present invention focuses on a configuration of a string-shaped banding band used for attachment and fixation of an RFID tag and for allowing the RFID tag to be raised from a surface of a product to which the tag is attached and which product may be made of a metallic material or the like, by causing the RFID tag to be flexed by bringing the RFID tag into contact with a head portion of the banding band.

A first aspect of the invention provides an RFID tag including: a tag base; and an RFID inlet provided for the tag base, the inlet having an IC chip and an RFID antenna, and being capable of performing wireless data communication. The tag base includes a through hole for allowing a banding band to be inserted therethrough. The banding band has a strap-like band main body, a head portion provided on one end of the band main body, and a tail portion provided on the other end of the band main body. The RFID tag is attached to an article by inserting the tail portion into and to be engaged with an engagement through hole in the head portion. The through hole is configured of a first through bore defined in a through-thickness direction of the tag base, and a second through bore defined in the through-thickness direction of the tag base at a position different from the position of the first through bore and in parallel with the first through bore in a lengthwise direction. The through bores are defined to be smaller than the head portion of the banding band. The tag base includes a base region for raising and a holding region for holding the inlet with the through hole being provided as a border between the regions. The base region for raising is provided for raising the RFID inlet with respect to the article. The holding region for holding the inlet having the RFID inlet is allowed to be raised from the base region for raising.

A second aspect of the invention provides an RFID tag including: a tag base and an RFID inlet provided for the tag base. The tag has an IC chip and an RFID antenna and is capable of performing wireless data communication. The tag base includes: a first base layer on a side of one surface and a second base layer on a side of the other surface. The RFID inlet is provided between the first base layer and the second base layer. There is a through hole for allowing a banding band to be inserted therethrough, the banding band having a strap-like band main body, a head portion provided on one end of the band main body, and a tail portion provided on the other end of the band main body. Attachment of the RFID tag to an article is by inserting the tail portion into and engaging it with an engagement through hole in the head portion. The through hole is defined to be smaller than the head portion of the banding band. The tag base includes a base region for raising and a holding region for holding the inlet, with the through hole being provided as a border between the regions. The base region for raising is provided for raising the RFID inlet with respect to the article, and the region for holding the inlet has the RFID inlet and is allowed to be raised from the base region for raising.

A third aspect of the invention provides a method of attaching an RFID tag. The tag includes: a tag base; and an RFID inlet provided for the tag base. The tag has an IC chip and an RFID antenna and is capable of performing wireless data communication. The tag base includes a through hole for allowing a banding band to be inserted therethrough. The banding band has a strap-like band main body, a head portion provided on one end of the band main body, and a tail portion provided on the other end of the band main body. Attachment of the RFID tag to an article is allowed by inserting the tail portion into and engaging it with an engagement through hole in the head portion. The through hole is configured by a first through bore defined in a through-thickness direction of the tag base. A second through bore is defined in the through-thickness direction of the tag base at a position different from the position of the first through bore and in parallel with the first through bore in a lengthwise direction. The through bores are defined to be smaller than the head portion of the banding band. The tag base includes a base region for raising and a region for holding the inlet with the through hole provided as a border between the regions. The base region for raising is provided for raising the RFID inlet with respect to the article. The holding region for holding the inlet has the RFID inlet and is allowed to be raised from the base region for raising, and the RFID tag is attached to the article such that the RFID inlet within the region for holding inlet is spaced apart from the article in a state in which the banding band is inserted into the first through bore and the second through bore of the tag base from the tail portion. This is done by winding the band main body around the article, inserting the tail portion into and engaging it with the engagement through hole of the head portion, fastening the tag to the article by the band main body, and causing the tag base to be placed over the head portion of the banding band.

The tag base may be flexible at a portion of the through hole.

The RFID inlet may be spaced apart from the article by causing the tag base to be placed over the head portion of the banding band.

The tail portion of the banding band may urge the tag base toward a direction in which the RFID inlet comes away from the article.

The first base layer and the second base layer may be made of a soft material.

There may be at least a plurality of the through holes defined in the tag base in parallel with each other in a crosswise direction.

Advantageous Effects of Invention

According to the RFID tag and the method of attaching the RFID tag of the present invention, the tag base is provided with the through hole, the RFID inlet is provided for one of the regions of the tag base that are provided with the through hole between the regions (region for holding inlet) as a border, the banding band is inserted through the through hole, the RFID tag is attached to an article using the banding band, and the tag base (RFID inlet) may be held in a posture raised from a surface of the article. Thus, it is possible to provide an RFID tag capable of stably and reliably holding the RFID inlet spaced apart from the surface of the article even when the article is made of a metal, and that is capable of maintaining data communication function for an extended period of time, and has a superior environment resistance.

In particular, according to the RFID tag of the first aspect of the invention, the through hole includes the first through bore defined in the through-thickness direction of the tag base, and the second through bore defined at a position different from the position of the first through bore. The tag base includes the base region for raising and the region for holding inlet with the through hole being provided as a border between the regions. The base region for raising is provided for allowing the RFID inlet to be held raised from the article. The region for holding the inlet having the RFID inlet and being allowed to be raised with respect to the base region for raising. Therefore, the RFID tag may be attached in a condition in which the region for holding inlet is raised from the base region for raising and the RFID inlet is spaced apart from the surface of the article. In addition, as the banding band is inserted into and engaged with the first through bore and the second through bore, the RFID tag may be firmly attached to the article.

In particular, according to the RFID tag of the second aspect of the invention, the tag base includes: the first base layer on the side of the one surface; and the second base layer on the side of the other surface, and the RFID inlet is provided between the first base layer and the second base layer. Therefore, by selecting a material for each of the base layers, it is possible to provide elasticity, flexibility, and an environment resistance required for the tag base at a low price, and the RFID tag may be attached in a state in which the tag base may be raised based on the through hole and the RFID inlet is spaced apart from the surface of the article.

In particular, according to the method of attaching the RFID tag of the third aspect of the invention, the RFID tag is attached to the article such that the RFID inlet is spaced apart from the article, in a condition in which the banding band is inserted into the first through bore and the second through bore of the tag base from the tail portion. The band main body is wound around the article. The tail portion is inserted into and engaged with the engagement through hole of the head portion to form a ring shape. The article is fastened by the band main body. The tag base is placed over the head portion of the banding band by bringing the tag base into contact with the head portion of the banding band. Therefore, it is possible to attach reliably and stably and to stably and reliably maintain the raised state of the tag base.

DESCRIPTION OF EMBODIMENTS

Figure 1:
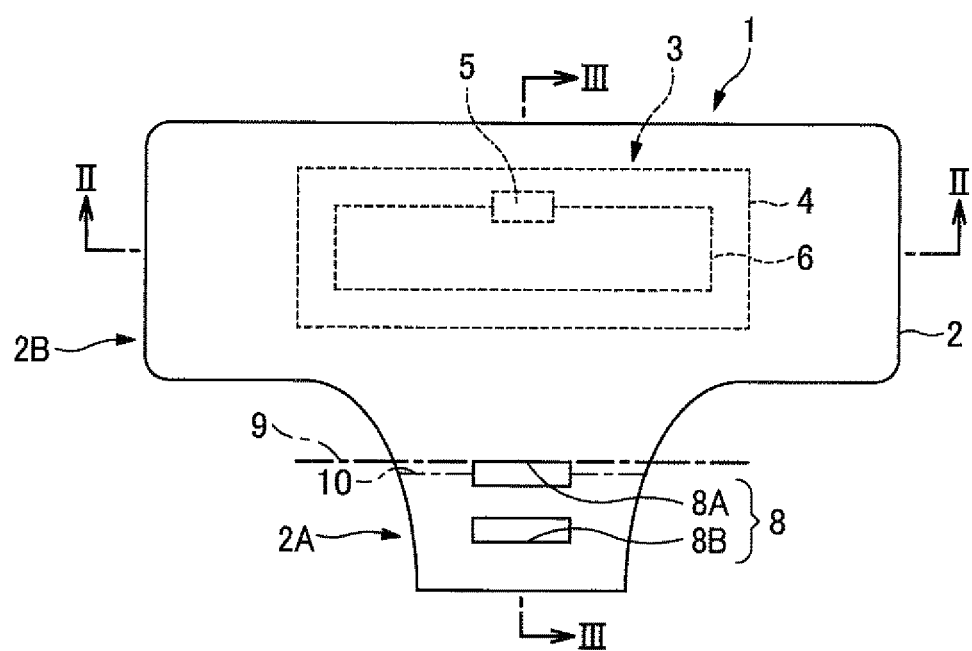
FIG. 1 is a plan view illustrating an RFID tag 1 of a first embodiment according to the present invention.

According to the present invention, an RFID tag may be applied to an article made of a metallic material or the like by inserting a banding band into a through hole in a tag base. Thus, an RFID tag with which an RFID inlet may be stably and reliably attached to the article for an extended period of time while spaced apart from a surface of the article, and capable of ensuring its data communication function, as well as a method of attaching such an RFID tag are realized.

Examples

Hereinafter, an RFID tag 1 of a first embodiment according to the present invention, and a method of attaching the RFID tag 1 will be described.

The RFID tag 1 includes a tag base 2 and an RFID inlet 3.

The tag base 2 comprises a base sheet comprised, for example, of a synthetic resin having predetermined flexibility or elasticity, and rigidity. The tag base 2 has the RFID inlet 3 contained therein.

The RFID inlet or support 3 includes an inlet base 4 comprised, for example, of polyethylene terephthalate or a film stack of polyethylene terephthalate, an IC chip 5 on the film or the stack thereof, and an RFID antenna 6, and this assembly is able to perform wireless data communication. The RFID inlet 3 performs reading and writing of data required for the IC chip 5 wirelessly via the RFID antenna 6 (data communication) based on an electromagnetic effect of radio waves in a predetermined frequency band such as a UHF band (300 MHz to 3 GHz (preferably, 860 MHz to 960 MHz, more specifically, 433 MHz, 900 MHz, 915 MHz to 928 MHz, or 950 to 958 MHz), microwaves (1 GHz to 30 GHz, specifically 2.45 GHz), and an HF band (3 MHz to 30 MHz (preferably, 13.56 MHz)) or at a frequency no higher than 135 kHz. However, specific configurations of the IC chip 5 and the RFID antenna 6 are adjusted suitably depending on radio waves to be used by each component. In particular, a communication distance of a component using radio waves having a wavelength in the UHF band (e.g., 860 MHz to 960 MHz) is typically on the order of 5 m to 10 m, and an application of such component in various fields is expected.

The tag base 2 is provided with through hole 8 for insertion of a banding band 7 (see FIG. 5 and FIG. 6, described later) at a position excluding and avoiding a region of the RFID inlet 3. The through hole 8 is configured of a first through bore 8A having an elongated rectangular opening (see FIG. 1) extending in a through-thickness direction of the tag base 2, and a similarly elongated rectangular second through bore 8B also extending in the through-thickness direction of the tag base 2. The second through bore 8B is at a position different from the position of the first through bore 8A and extends parallel to the first through bore 8A in a lengthwise direction. It should be noted that the first through bore 8A and the second through bore 8B may be slit-like, as long as a tail portion 17 and a band main body 15 of the banding band 7 may be inserted. The tag base 2 includes a base region 2A for raising and a holding region for the holding inlet 2B to be raised, with the through hole 8 (the first through bore 8A) being provided as a border between the regions. The base region for raising 2A allows the RFID inlet 3 to be held raised and spaced apart with respect to an article, and the region for holding the inlet 2B which has the RFID inlet 3 is allowed to be raised with respect to the base region for raising region 2A.

Further, as the tag base is provided with predetermined flexibility or elasticity and rigidity, the tag base 2 may be flexed at a portion of the through hole 8 (the first through bore 8A), specifically, at a flexed portion 9 along the length of the opening of the first through bore 8A. In order to ensure the flexibility, it is possible to previously provide a cut line or folding line 10 (an imaginary line in FIG. 1) along the flexed portion 9 in a crosswise direction of the first through bore 8A as needed. As illustrated in FIG. 1, the base region for raising 2A is a region illustrated on the side under the flexed portion 9, and the region for holding inlet 2B is a region illustrated on the side above the flexed portion 9.

Figure 2:
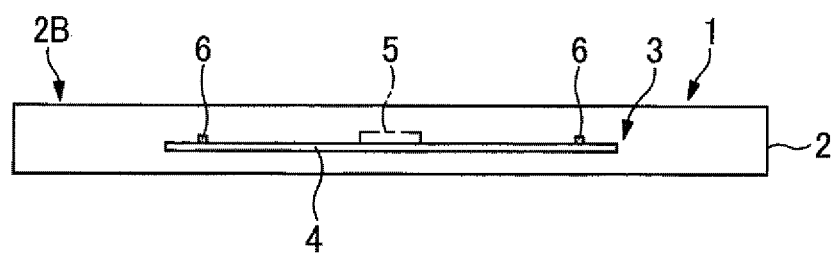
FIG. 2 is a sectional view taken along line II-II in FIG. 1 of the first embodiment according to the present invention.
Figure 3:
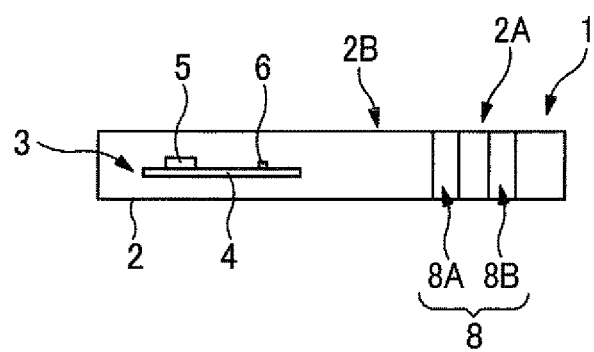
FIG. 3 is a sectional view taken along line III-III in FIG. 1 of the first embodiment according to the present invention.
Figure 4:
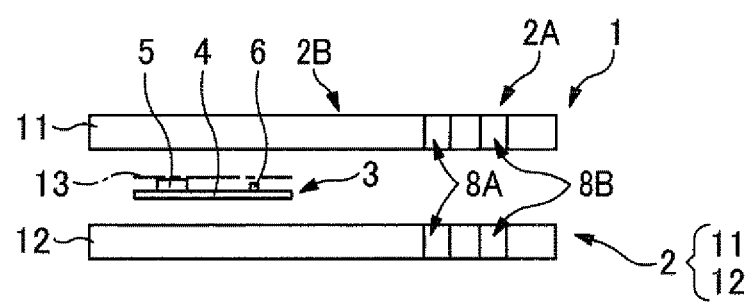
FIG. 4 is an exploded sectional view of the RFID tag 1 similarly to FIG. 3 of the first embodiment according to the present invention.

A sectional structure of the RFID tag 1 (the tag base 2) illustrated in FIG. 2 and FIG. 3 is not limited to a single-layer structure, and may be provided by any processing such as a laminating process, an injection molding process, or a process of combination of these, and may have a multi-layer structure as shown in FIG. 4, for example. Specifically, FIG. 4 is an exploded sectional view of the RFID tag 1 similar to the one illustrated in FIG. 3, showing the tag base 2 having a first base layer 11 on the side of one surface and a second base layer 12 on the side of the other surface, and the RFID inlet 3 attached between the first base layer 11 and the second base layer 12 by an adhesive agent 13 or the like. The RFID inlet 3 inside the layers is laminated and covered by the first base layer 11 and the second base layer 12 so as to provide strong protection.

The first base layer 11 and the second base layer 12 are configured of a soft material to acquire flexibility or elasticity. For example, by employing any soft material such as a flexible polyvinyl chloride material, it is possible to produce the RFID tag 1 at a relatively low price.

Figure 5:
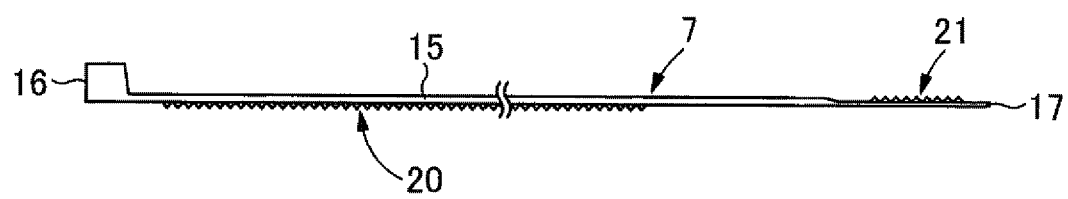
FIG. 5 is a side view of a banding band 7 of the first embodiment according to the present invention.
Figure 6:
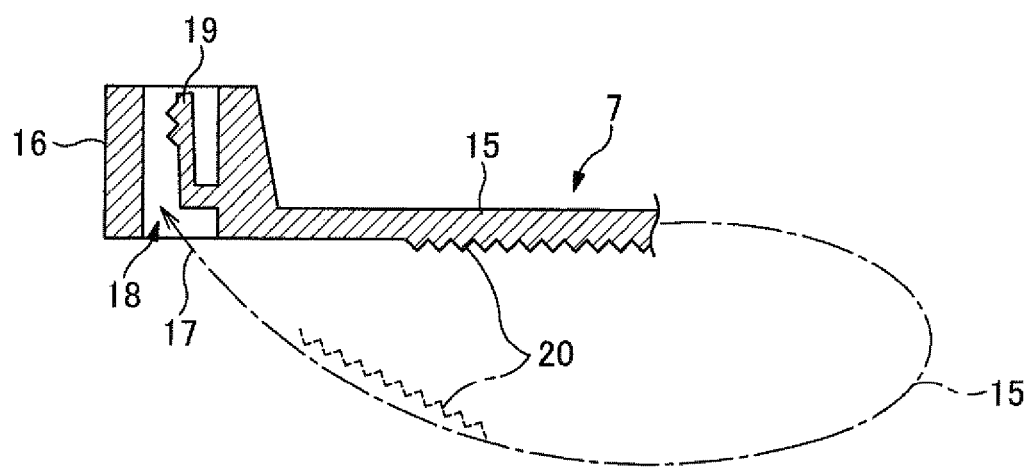
FIG. 6 is a partially enlarged sectional view of the banding band 7 of the first embodiment according to the present invention.

FIG. 5 is a side view of the banding band 7, and FIG. 6 is a partially enlarged sectional view of the banding band 7. The banding band 7 is configured by a commonly-available material such as nylon, and includes the strap-like band main body 15 of a predetermined length, a head portion 16 in an expanded shape provided on one end of the band main body 15, and the tapered tail portion 17 provided on the other end of the band main body 15.

As illustrated specifically in FIG. 6, an engagement through hole 18 is defined in the head portion 16, and an elastic engagement projection for fixation 19 is provided within the engagement through hole 18.

On one side of the band main body 15, there is provided a strip-shaped concavo-convex or toothed engagement portion 20 that engages with the elastic engagement projection or teeth for fixation 19 to allow fastening and fixation of the banding band 7 as a whole in a ring shape of a selected circumferential length. Further, on the other side of the tail portion 17, there is a concavo-convex or toothed portion 21 that helps to hold the tail portion 17. Thus, the RFID tag 1 may be attached to an article (a metallic material M, see FIG. 7, described later) by having the tail portion 17 be first inserted into the first through bore 8A and then into the second through bore 8B of the RFID tag 1, and into the engagement through hole 18 of the head portion 16, and having the elastic engagement projection for fixation 19 be engaged with any part of the strip-shaped engagement portion 20 to form the band main body 15 into the ring of a predetermined circumferential length.

However, it is required that the through hole 8 (the first through bore 8A and the second through bore 8B, FIG. 1 and FIG. 3) are defined to be smaller than the head portion 16 of the banding band 7.

Figure 7:
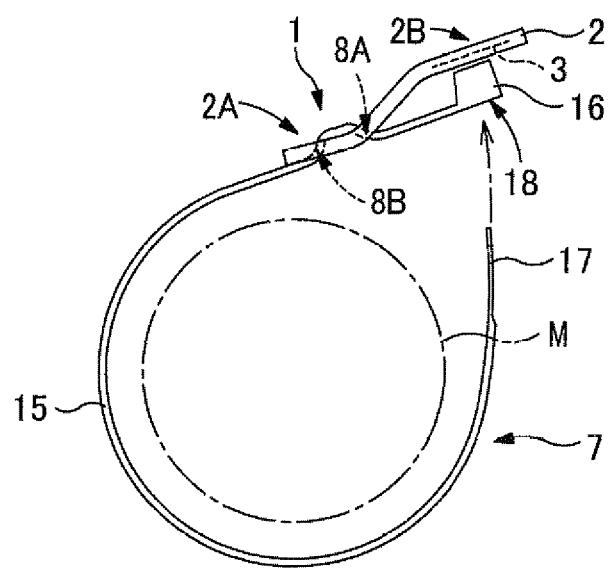
FIG. 7 is a side view showing a state of the RFID tag 1 in the middle of attachment to any metallic material M using the banding band 7 in the first embodiment according to the present invention.
Figure 8:
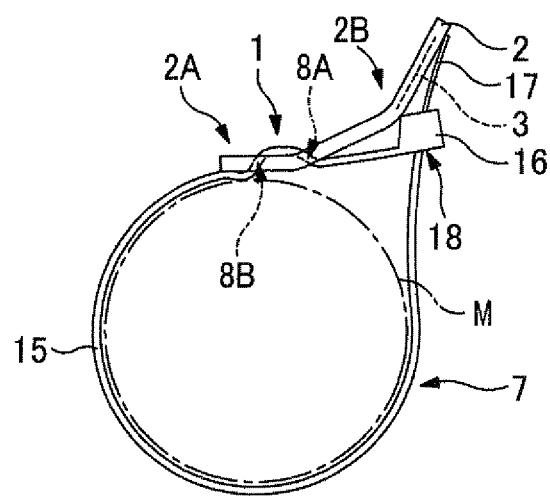
FIG. 8 is a side view showing a state of the RFID tag 1 that has been attached to the metallic material M using the banding band 7 in the first embodiment according to the present invention.

According to the RFID tag 1 thus configured, the RFID tag 1 may be attached to any article (e.g., the metallic material M) using the banding band 7. Specifically, FIG. 7 is a side view showing a state with the RFID tag 1 during its attachment to the any metallic material M using the banding band 7, and FIG. 8 is a side view showing a state of the RFID tag 1 that have been attached to the metallic material M using the banding band 7. As illustrated in FIG. 7, in a state in which the banding band 7 is inserted into the through hole 8 (first through the first through bore 8A, and then through the second through bore 8B) of the tag base 2 from the tail portion 17, the band main body 15 is wound around the metallic material M, and the tail portion 17 is inserted into the engagement through hole 18 of the head portion 16.

Then, as illustrated in FIG. 8, the tail portion 17 is pulled so as to be further pulled out of the head portion 16, and when pulled tight the metallic material M is fastened by the band main body 15 in a ring shape, and the tag base 2 is also caused to be placed over the head portion 16 of the banding band 7, whereby the base region for raising 2A between the first through bore 8A and the second through bore 8B is closely attached to an outer surface of the metallic material M, and the region for holding inlet 2B is flexed along the flexed portion 9 so as to be raised from the metallic material M. Thus, the RFID tag 1 may be attached to the metallic material M such that the RFID inlet 3 within the region for holding inlet 2B is spaced apart from the metallic material M. Therefore, the data communication function may be maintained as the state in which the RFID inlet 3 is spaced apart from the metallic material M is maintained.

However, as the engaged state between the elastic engagement projection for fixation 19 and the concavo-convex strip-shaped engagement portion 20 in the head portion 16 is maintained, the state in which the tag base 2 is placed over the head portion 16 of the banding band 7 is fixed, and therefore it is possible to stably and reliably realize the state in which the RFID inlet 3 is spaced apart from the metallic material M.

Further, as the band main body 15 or the tail portion 17 has predetermined rigidity, the tail portion 17 of the banding band 7 is able to urge the tag base 2 (the region for holding inlet 2B) toward a direction in which the region for holding inlet 2B (the RFID inlet 3) comes away from the metallic material M, it is possible to maintain a raised posture of the region for holding inlet 2B by the head portion 16. It should be appreciated that if the tail portion 17 is too long, it is possible to cut its tip end portion as needed.

It should be noted that according to the present invention, the RFID tag 1 may be attached to the metallic material M in the same manner as described above by having the banding band 7 (the tail portion 17) be inserted only into the first through bore 8A, without having the banding band 7 (the tail portion 17) be inserted into the second through bore 8B of the through hole 8.

Figure 9:
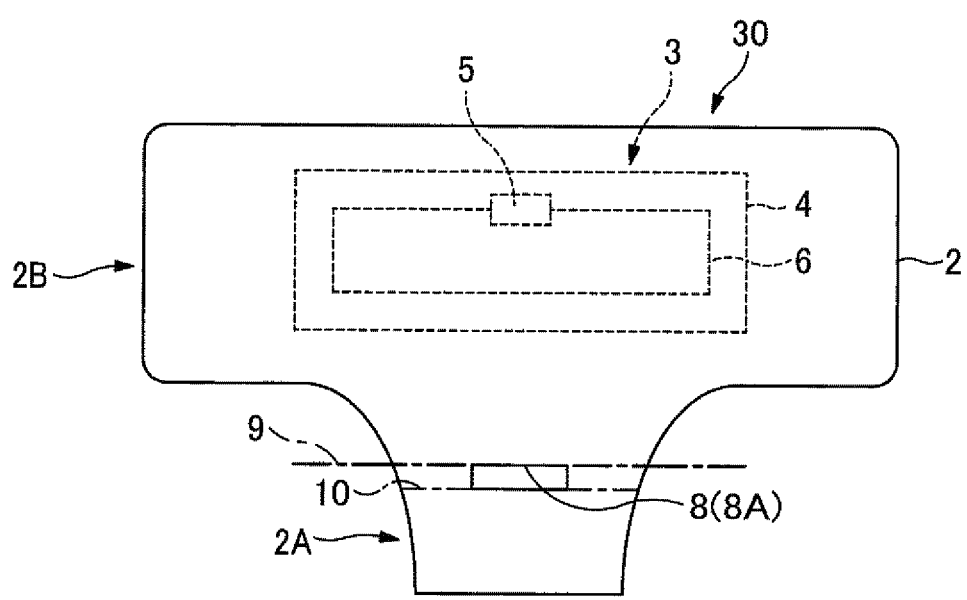
FIG. 9 is a plan view illustrating an RFID tag 30 of a second embodiment according to the present invention.

Further, only the first through bore 8A may be provided as the through hole 8. Specifically, FIG. 9 is a plan view illustrating an RFID tag 30 of a second embodiment according to the present invention, and in the RFID tag 30, only a single through hole 8 (e.g., a first through bore 8A) is provided in a tag base 2. The remaining part of the configuration is practically the same as that of the RFID tag 1 in the first embodiment, and therefore like components are denoted by like reference numerals, and descriptions for such components are omitted.

Figure 10:
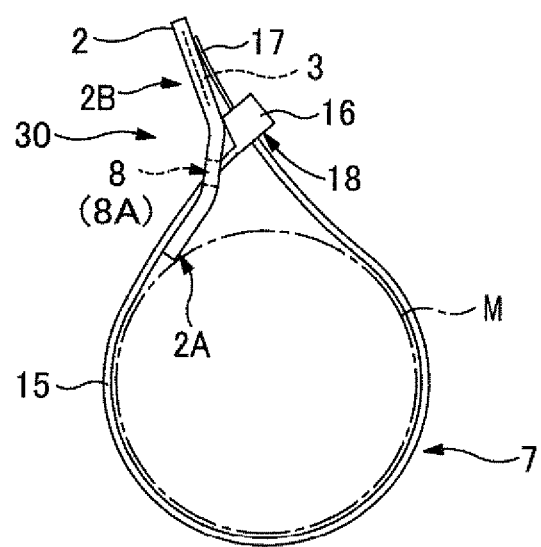
FIG. 10 is a side view showing a state of the RFID tag 30 that have been attached to the metallic material M using the banding band 7 in the second embodiment according to the present invention.

According to the RFID 30 thus configured, similarly to the RFID 1 (the first embodiment, FIG. 1), the RFID tag 30 may be attached to any metallic material M using the banding band 7. Specifically, FIG. 10 is a side view showing a state of the RFID tag 30 that have been attached to the metallic material M using the banding band 7. In a state in which the banding band 7 is inserted into the through hole 8 (the first through bore 8A) of the tag base 2 from the tail portion 17, the band main body 15 is wound around the metallic material M, and the tail portion 17 is inserted into the engagement through hole 18 of the head portion 16. Then, as illustrated in FIG. 10, the tail portion 17 is pulled so as to be further taken out of the head portion 16, the metallic material M is fastened by the band main body 15 in a ring shape, and the tag base 2 is caused to be placed over the head portion 16 of the banding band 7. With this, the base region for raising 2A is closely attached to an outer surface of the metallic material M, and the region for holding inlet 2B is flexed along the flexed portion 9 so as to be raised from the metallic material M. Thus, the RFID tag 30 may be attached to the metallic material M such that the RFID inlet 3 is spaced apart from the metallic material M.

However, similarly to the case described above with reference to FIG. 7 and FIG. 8, as the engaging state between the elastic engagement projection for fixation 19 and the concavo-convex strip-shaped engagement portion 20 in the head portion 16 is maintained, the state in which the tag base 2 is placed over the head portion 16 of the banding band 7 is fixed, and therefore it is possible to stably and reliably realize the state in which the RFID inlet 3 is spaced apart from the metallic material M. In this case, it is desirable that the through hole 8A of the banding band 7 in the through-thickness direction is as large as a section of the band main body 15 so as not to become loose easily.

Similarly, as the band main body 16 or the tail portion 17 has predetermined rigidity, the tail portion 17 of the banding band 7 is able to urge the tag base 2 toward the direction in which the region for holding inlet 2B (the RFID inlet 3) comes further away from the metallic material M, it is possible to maintain the raised posture of the region for holding inlet 2B by the head portion 16.

According to the present invention, not only the shape of the tag base 2, but also the shape, the orientation, the position, and the number of the through hole 8, may be arbitrarily set depending on the size and particularly how large is the RFID antenna 6 of the RFID inlet 3, the shape and the size of the metallic material M, the type of the banding band 7, and the like.

Figure 11:
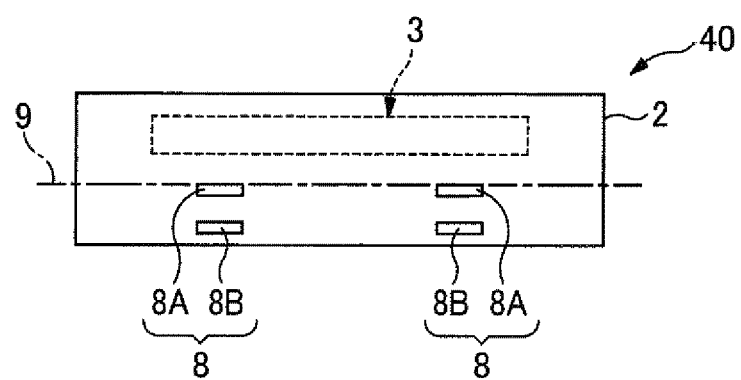
FIG. 11 is a plan view illustrating an RFID tag 40 of a third embodiment according to the present invention.

FIG. 11 is a plan view illustrating an RFID tag 40 of a third embodiment according to the present invention. In the RFID tag 40, there are a plurality (two, in the illustrated example) of the through hole 8 (the first through bore 8A and the second through bore 8B) in parallel with each other in the crosswise direction along the flexed portion 9 in the tag base 2. The remaining part of the configuration is practically the same as that of the RFID tag 1 (first embodiment, FIG. 1).

According to the RFID tag 40 thus configured, the banding band 7 may also be inserted into and engaged with the through hole 8, and the RFID tag 40 may be stably and reliably attached to the metallic material M even if the RFID tag 40 (in particular, the RFID antenna 6) expands in the crosswise direction, the region for holding inlet 2B (the RFID inlet 3)

may be raised while being spaced apart from the metallic material M, and it is possible to increase a communication distance.

REFERENCE SIGNS LIST

1: RFID Tag (First Embodiment, FIG. 1)
2: Tag Base
2A: Base Region for Raising of Tag Base 2
2B: Region for Holding Inlet of Tag Base 2
3: RFID Inlet
4: Inlet Base
5: IC Chip
6: RFID Antenna
7: Banding Band (FIG. 5 and FIG. 6)
8: Through Hole
8A: First Through Bore of Through Hole 8
8B: Second Through Bore of Through Hole 8
9: Flexed Portion (FIG. 1, FIG. 9, and FIG. 11)
10: Cut Line or Folding Line
11: First Base Layer (FIG. 4)
12: Second Base Layer
13: Adhesive Agent
15: Band Main Body of Banding Band 7
16: Head Portion of Banding Band 7
17: Tail Portion of Banding Band 7
18: Engagement Through Hole
19: Elastic Engagement Projection for Fixation
20: Strip-Shaped Engagement Portion
21: Concavo-Convex Portion
30: RFID Tag (Second Embodiment, FIG. 9)
40: RFID Tag (Third Embodiment, FIG. 11)
M: Metallic Material (Article, FIG. 7, FIG. 8, and FIG. 10)

The invention claimed is:

1. A method of attaching an RFID tag to an article, comprising:
providing a tag base; providing an RFID inlet provided for the tag base, the RFID inlet having an IC chip and an RFID antenna at the RFID inlet, and being capable of performing wireless data communication, wherein the tag base includes a through hole configured for allowing a banding band to be inserted therethrough, the banding band having a strap-like band main body, a head portion provided on one end of the band main body, and a tail portion provided on another, opposite end of the band main body the tag base having an engagement through hole in the head portion configured such that the tail portion may be removably inserted and engaged in the through hole for allowing attachment of the RFID tag to an article;
the through hole is configured by a first through bore defined in a through-thickness direction of the tag base, and a second through bore defined in the through-thickness direction of the tag base at a position on the tag base different from the position thereon of the first through bore and in parallel with the first through bore in a lengthwise direction;
the through bores are each defined to be smaller than the head portion of the banding band;
the tag base includes a base region for raising a holding region for holding the inlet, the through hole defining a border between the regions, the base region for raising being configured and operable for raising the RFID inlet with respect to the article, and the holding region being configured for holding the RFID inlet and being configured to be raised from the base region; and the method comprising:
attaching the RFID tag to the article such that with the RFID inlet within the holding region for the holding inlet, spacing the holding inlet apart from the article inserting the banding band into the first through bore and the second through bore of the tag base from the tail portion, winding the band main body around the article, then inserting the tail portion into engagement with the engagement through hole of the head portion, and thereby fastening the article by the band main body, and placing the tag base over the head portion of the banding band.

* * * * *